(12) United States Patent
Benson et al.

(10) Patent No.: US 8,967,351 B2
(45) Date of Patent: Mar. 3, 2015

(54) TRANSMISSION CLUTCH PISTON COMPENSATOR FEED CIRCUIT

(71) Applicant: GM Global Technology Operations LLC, Detroit, MI (US)

(72) Inventors: Christopher G. Benson, Rochester Hills, MI (US); Todd R. Berger, Pinckney, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/937,419

(22) Filed: Jul. 9, 2013

(65) Prior Publication Data

US 2014/0048377 A1 Feb. 20, 2014

Related U.S. Application Data

(60) Provisional application No. 61/683,010, filed on Aug. 14, 2012.

(51) Int. Cl.
*F16D 48/02* (2006.01)
*F16D 25/0638* (2006.01)
*F16D 25/00* (2006.01)

(52) U.S. Cl.
CPC ............ *F16D 25/00* (2013.01); *F16D 25/0638* (2013.01); *F16D 48/02* (2013.01); *F16D 48/0206* (2013.01); *F16D 2048/0209* (2013.01)
USPC ................ 192/48.601; 192/85.63; 192/106 F

(58) Field of Classification Search
USPC ......... 192/85.25, 106 F, 85.61, 48.601, 85.63
See application file for complete search history.

(56) References Cited

U.S. PATENT DOCUMENTS

| | | | |
|---|---|---|---|
| 5,518,098 A * | 5/1996 | Zanetel et al. | 192/113.35 |
| 6,361,287 B1 | 3/2002 | Hopper | |
| 7,325,885 B2 | 2/2008 | Berger et al. | |
| 7,497,799 B2 | 3/2009 | Hagelskamp et al. | |
| 7,621,836 B2 | 11/2009 | Lim | |
| 8,069,661 B2 | 12/2011 | Hendrickson et al. | |
| 8,613,681 B2 | 12/2013 | Sowards et al. | |
| 2003/0111314 A1* | 6/2003 | Moorman et al. | 192/85 AA |
| 2007/0256907 A1* | 11/2007 | Gremplini et al. | 192/87.11 |
| 2011/0042177 A1* | 2/2011 | Bauer et al. | 192/85.61 |
| 2011/0118081 A1* | 5/2011 | Moorman et al. | 477/61 |

FOREIGN PATENT DOCUMENTS

| | | |
|---|---|---|
| DE | 2141564 A1 | 2/1973 |
| DE | 4320353 A1 | 1/1994 |
| DE | 19813982 A1 | 10/1999 |
| DE | 19857222 A1 | 6/2000 |
| DE | 10147123 A1 | 4/2002 |
| DE | 10327406 A1 | 2/2005 |
| DE | 102004001753 A1 | 8/2005 |

(Continued)

*Primary Examiner* — Gene Crawford
*Assistant Examiner* — Lillian Nguyen

(57) ABSTRACT

A hydraulic control system of an automatic transmission includes a clutch compensator feed circuit that is in communication with clutch apply circuit exhaust fluid. The clutch compensator feed circuit receives exhaust fluid from one or more apply clutches, or other torque transmitting device(s), and feeds the exhaust fluid to the balance side of the clutch or other torque transmitting device. The clutch compensator feed circuit may be open to atmospheric pressure, such that the clutch compensator feed circuit is not pressurized with respect to atmospheric pressure.

18 Claims, 6 Drawing Sheets

(56) References Cited

FOREIGN PATENT DOCUMENTS

| | | | |
|---|---|---|---|
| DE | 102005006431 | A1 | 8/2006 |
| EP | 0157086 | A1 | 10/1985 |
| EP | 0475488 | A1 | 3/1992 |
| EP | 0933564 | A2 | 8/1999 |
| EP | 1420185 | A2 | 5/2004 |
| WO | WO9705410 | A1 | 2/1997 |

* cited by examiner

TRANSMISSION CLUTCH PISTON COMPENSATOR FEED CIRCUIT

CROSS-REFERENCE TO RELATED APPLICATIONS

This application claims the benefit of U.S. Provisional Application No. 61/683,010 filed on Aug. 14, 2012. The disclosure of the above application is incorporated herein by reference.

FIELD

The present disclosure relates to a transmission torque transmitting mechanism control system, and more particularly, to an automatic transmission hydraulic clutch compensator feed circuit.

BACKGROUND

The statements in this section merely provide background information related to the present disclosure and may or may not constitute prior art.

A typical automatic transmission includes a hydraulic control system that is employed to actuate a plurality of torque transmitting devices as well as provide cooling and lubrication to the components of the transmission. These torque transmitting devices may be, for example, friction clutches and brakes. The conventional hydraulic control system typically includes a main pump that provides a pressurized fluid, such as oil, to a plurality of valves and solenoids within a valve body. The main pump can be driven by the engine of the motor vehicle or an auxiliary electric motor.

In order to actuate a given torque transmitting device, hydraulic fluid is directed through a clutch regulation valve to feed a clutch piston. The clutch piston translates the force of the hydraulic fluid acting on the piston into mechanical actuation within the torque transmitting device. In certain configurations, it is desirable to have a clutch compensator circuit that feeds hydraulic fluid to the opposite side of the clutch piston to initiate a rapid disengagement or release of the torque transmitting device and to balance the centrifugal effects of the rotating fluid. However, the compensator feed circuit requires additional line pressure from the main pump, which in turn reduces the efficiency of the transmission and requires a larger pump than would be needed without the compensator feed circuit. While conventional hydraulic control systems are effective, there is room in the art for an improved hydraulic control circuit.

SUMMARY

A hydraulic control system of an automatic transmission includes a clutch compensator feed circuit that is in communication with clutch apply circuit exhaust fluid. The clutch compensator circuit receives exhaust fluid from one or more apply clutches, or other torque transmitting device(s), and feeds the exhaust fluid to the balance side of the clutch or other torque transmitting device (the balance side is opposite the apply side). The clutch compensator feed circuit may be open to atmospheric pressure, such that the clutch compensator feed circuit is not pressurized with respect to atmospheric pressure.

A source of pressurized hydraulic fluid may be fed to a clutch regulating valve, which is operable to engage a piston. The clutch regulating valve may exhaust a certain amount of exhaust fluid, which is fed into a clutch compensator circuit. The clutch compensator circuit feeds the fluid to a balance side of the torque transmitting device, to balance the centrifugal forces created by applying fluid to the apply side of the torque transmitting device. The system may also include a compensator valve in communication with the source of pressurized hydraulic fluid to draw fluid into the clutch compensator feed circuit from the pressurized fluid source. The compensator valve is operable to allow communication of the hydraulic fluid from the source of pressurized hydraulic fluid to the balance side of the torque transmitting device to aid in the release of the torque transmitting device and to balance the centrifugal effects of the rotating fluid.

In one aspect, which may be combined with or separate from the other aspects described herein, a hydraulic control system for use in a transmission is provided, wherein the transmission has a torque transmitting device. The hydraulic control system includes a clutch apply circuit configured to selectively provide pressurized hydraulic fluid to a first side of the torque transmitting device to actuate the torque transmitting device. The hydraulic control system also includes a compensator feed circuit configured to provide exhaust hydraulic fluid to a second side of the torque transmitting device to balance centrifugal forces originating in the clutch apply circuit. The clutch apply circuit is configured to selectively provide the exhaust hydraulic fluid to the compensator feed circuit.

In another aspect, which may be combined with or separate from the other aspects described herein, a hydraulic control system for use in a transmission is provided. The hydraulic control system includes a torque transmitting device and a source of pressurized hydraulic fluid for providing a pressurized hydraulic fluid to the torque transmitting device. A clutch apply circuit is configured to selectively provide the pressurized hydraulic fluid to a first side of the torque transmitting device to actuate the torque transmitting device. A clutch regulation valve is in communication with the source of pressurized hydraulic fluid and in communication with the clutch apply circuit. The clutch regulation valve is operable to selectively allow communication of the pressurized hydraulic fluid from the source of pressurized hydraulic fluid to the clutch apply circuit. A compensator feed circuit is configured to provide exhaust hydraulic fluid to a second side of the torque transmitting device to balance centrifugal forces originating in the clutch apply circuit. The clutch apply circuit is configured to selectively provide the exhaust hydraulic fluid to the compensator feed circuit through the clutch regulation valve.

In yet another aspect, which may be combined with or separate from the other aspects described herein, a clutch compensator feed circuit is provided. The clutch compensator feed circuit is configured to provide exhaust hydraulic fluid to a balance side of a torque transmitting device in an automotive transmission to balance centrifugal forces originating in a clutch apply circuit. The clutch compensator feed circuit is configured to be fed exhaust fluid from the clutch apply circuit, wherein the clutch apply circuit is configured to selectively provide pressurized hydraulic fluid to an apply side of the torque transmitting device to actuate the torque transmitting device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
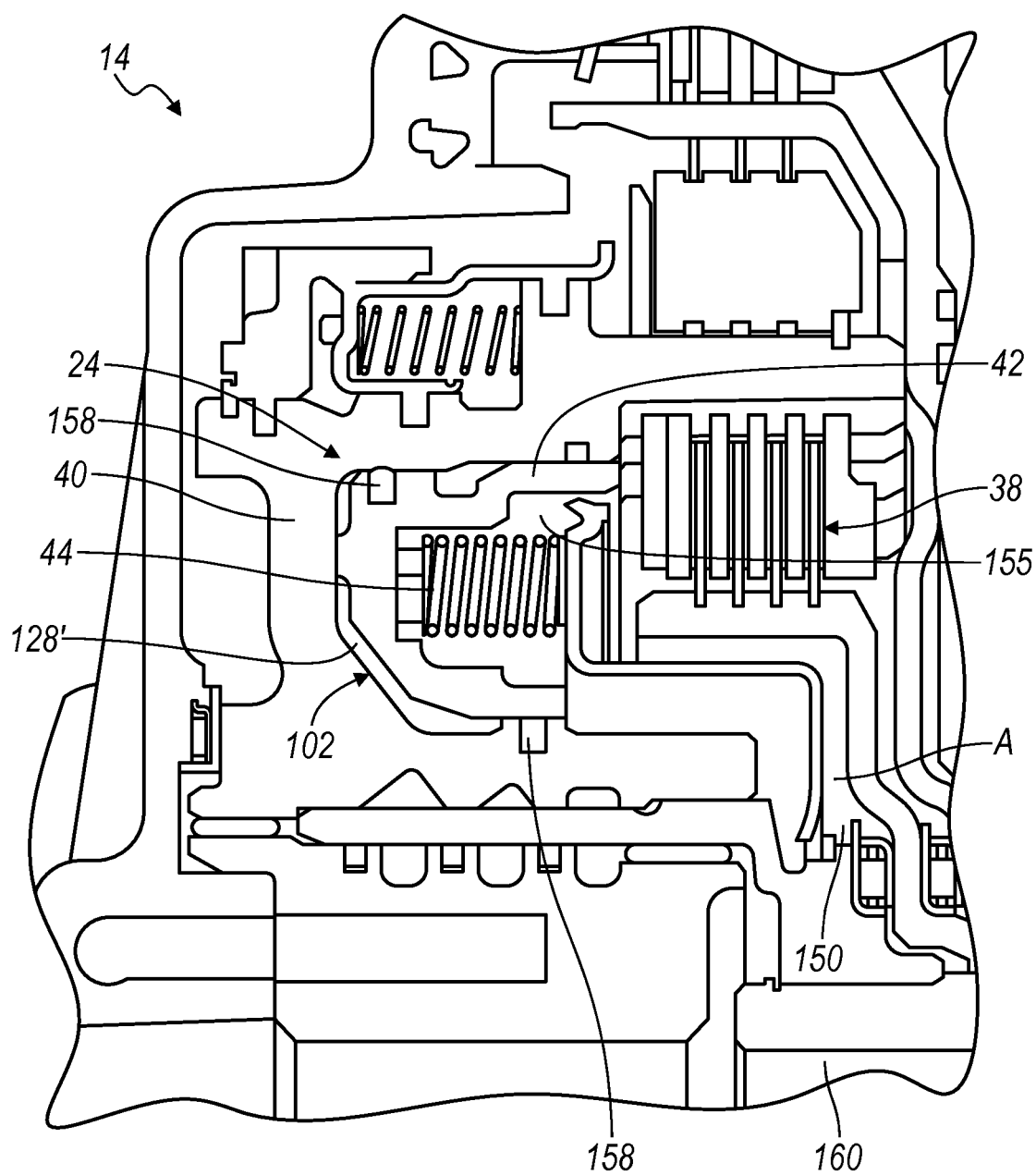
FIG. 4 is a cross-sectional view of part of the upper half of a transmission, including a hydraulic clutch compensator feed circuit system according to the principles of the present disclosure.
Figure 5:
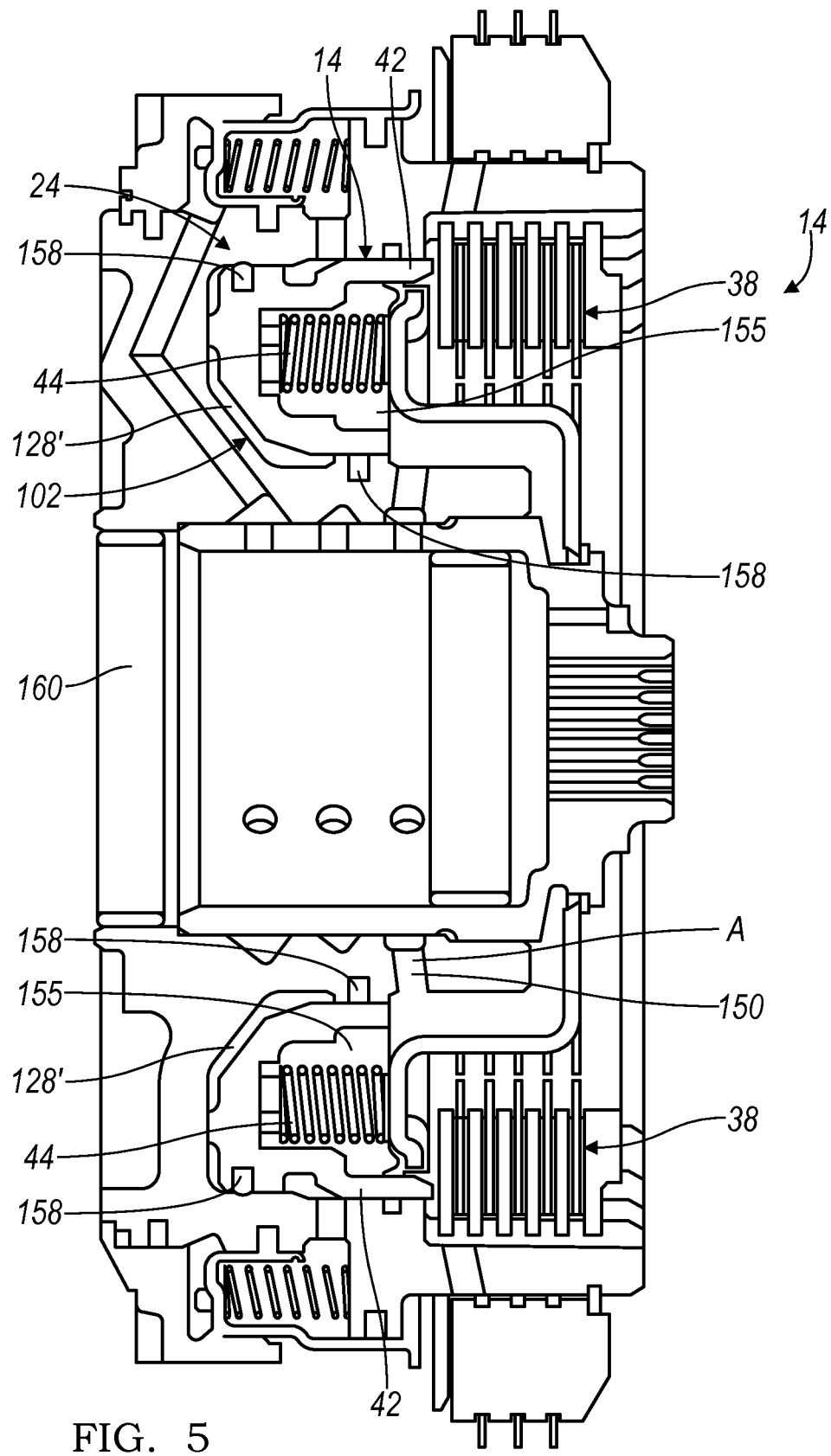
Figure 6:
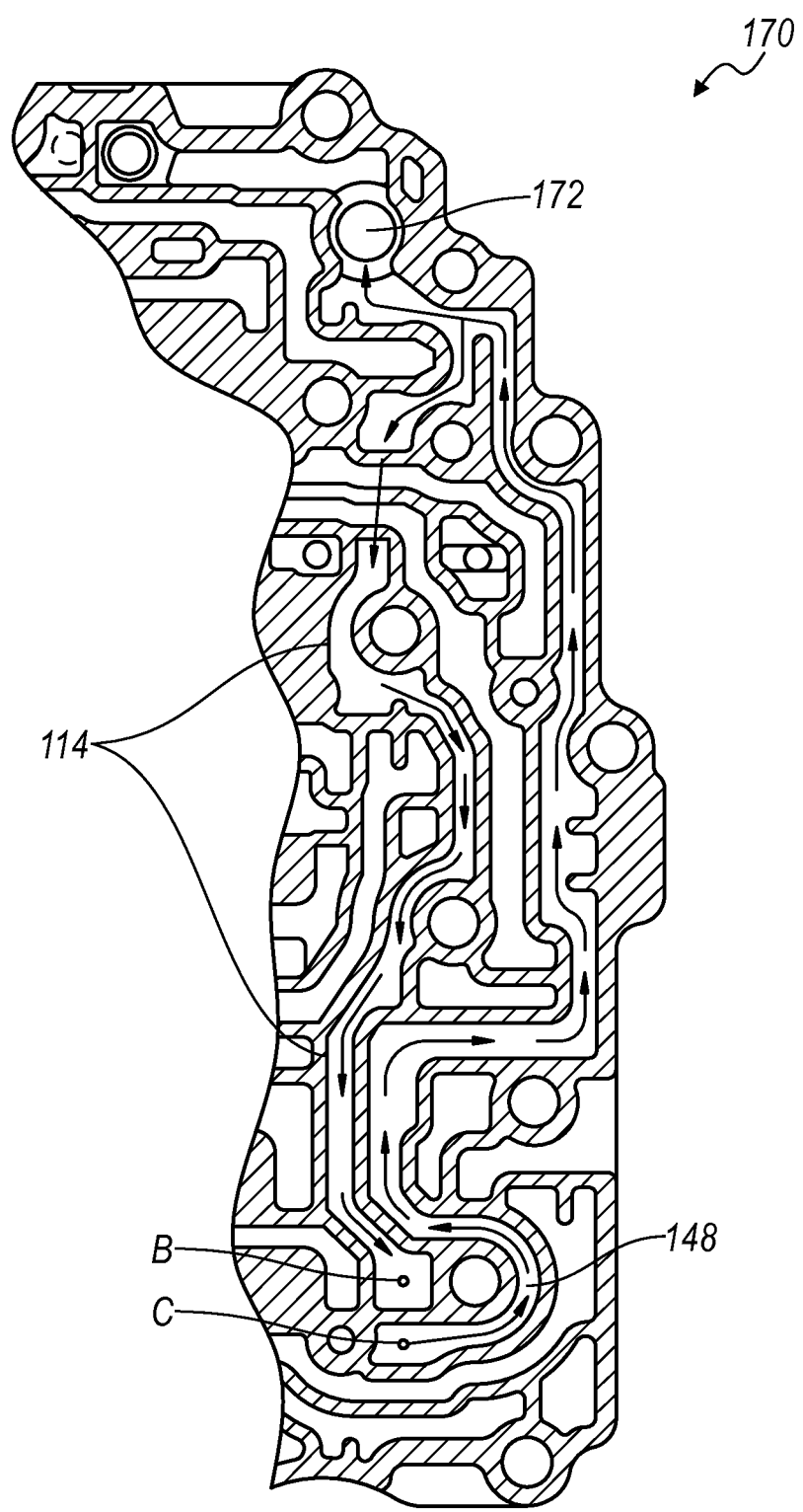

FIG. 5 is a cross-sectional view including the transmission of FIG. 4 and additional portions thereof, the transmission including a hydraulic clutch compensator feed circuit system according to the principles of the present disclosure; and FIG. 6 is a cross-sectional view of a valve body showing a flow path for a hydraulic clutch compensator feed circuit system, in accordance with the principles of the present disclosure.

DETAILED DESCRIPTION

The following description is merely exemplary in nature and is not intended to limit the present disclosure, application, or uses.

Figure 1:
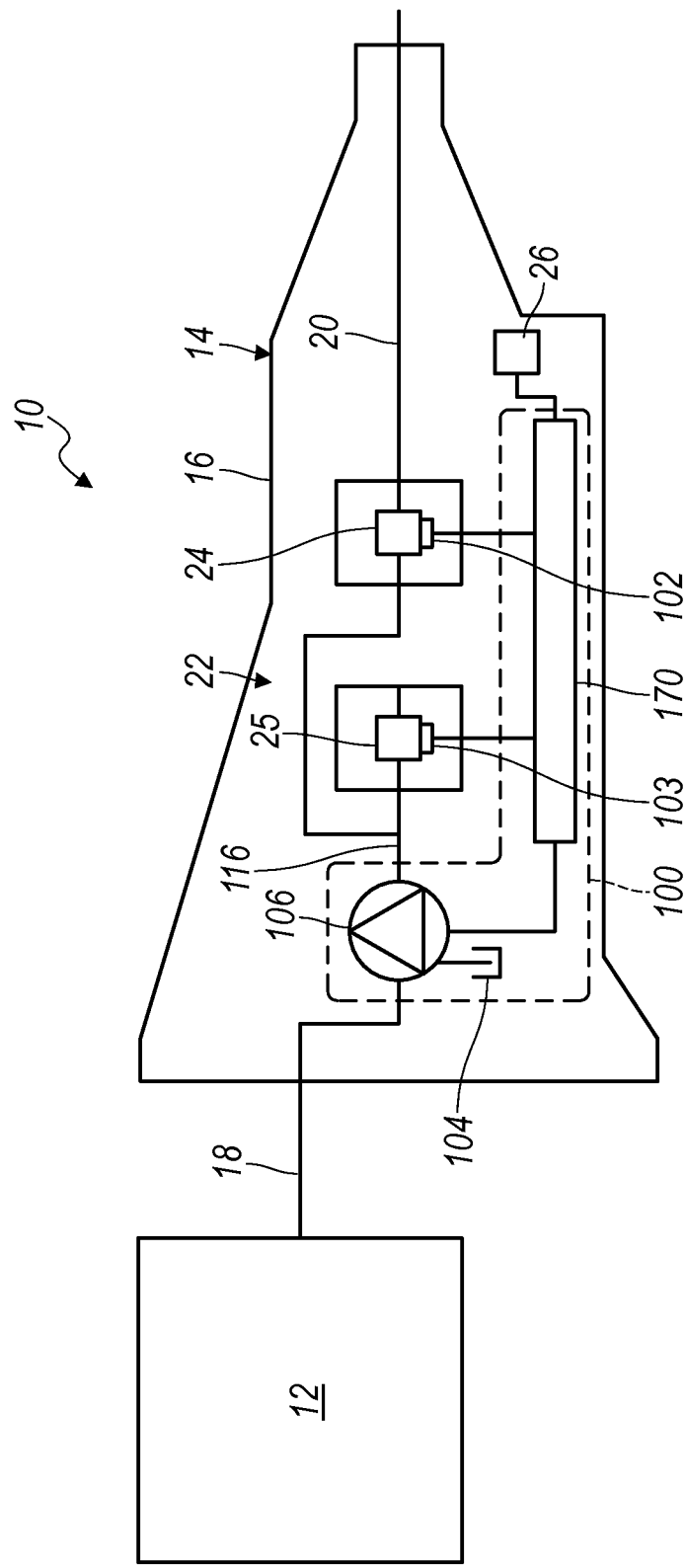
FIG. 1 is a schematic diagram of a powertrain having a hydraulic control system according to the principles of the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. If an electric engine, the engine 12 could be located within the transmission 14. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure, such as a front wheel drive transmission or transaxle. The input shaft 18 is connected with the engine 12 and receives input torque or power from the engine 12. The output shaft 20 is preferably connected with a final drive unit (not shown) which may include, for example, prop shafts, differential assemblies, and drive axles. The input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least one torque transmitting mechanism 24. In the illustrated example, two torque transmitting devices 24, 25 are shown, but it should be understood that any number of desired torque transmitting devices may be used, such as three, four, five, six, seven, eight, or more, by way of example. In the example provided, the torque transmitting mechanisms 24, 25 are selectively engageable to initiate a gear or speed ratio by selectively coupling individual gears within the plurality of gear sets to individual shafts within the plurality of shafts. Accordingly, the torque transmitting mechanisms 24, 25 may be any type of clutch or brake, including wet clutches, rotating clutches, etc., without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanisms 24, 25 via a hydraulic control system 100 according to the principles of the present disclosure.

The hydraulic control system 100 is operable to selectively engage one or both of the torque transmitting devices 24, 25 by selectively communicating a hydraulic fluid to a shift actuating device 102, 103 connected to the torque transmitting device 24, 25, as will be described in greater detail below. The shift actuating devices 102, 103 may be piston assemblies or any other hydraulically actuatable mechanism operable to engage and disengage the torque transmitting devices 24, 25 without departing from the scope of the present disclosure. The shift actuating devices 102, 103 are movable between an engaged position and a disengaged position. For example, when in the engaged position, the shift actuating device 102 engages the torque transmitting device 24, thereby allowing the torque transmitting device 24 to transmit torque therethrough; and the shift actuating device 103 operates the same way to actuate the torque transmitting device 25. When in the disengaged position, the shift actuating device 102 disengages the torque transmitting device 24 thereby prohibiting the torque transmitting device 24 to transmit torque therethrough. The hydraulic fluid used to actuate the shift actuating device 102 is communicated from a sump 104 under pressure via a pump 106 that is driven by the engine 12 or an auxiliary electric motor. The pump 106 may be of various types, for example, a gear pump, a vane pump, a gerotor pump, or any other positive displacement pump. A valve body 170 having a plurality of valves, solenoids, fluid channels, and other control devices selectively communicates the hydraulic fluid from the pump 106 to the shift actuating devices 102, 103 in order to engage or disengage the torque transmitting devices 24, 25.

Figure 2:
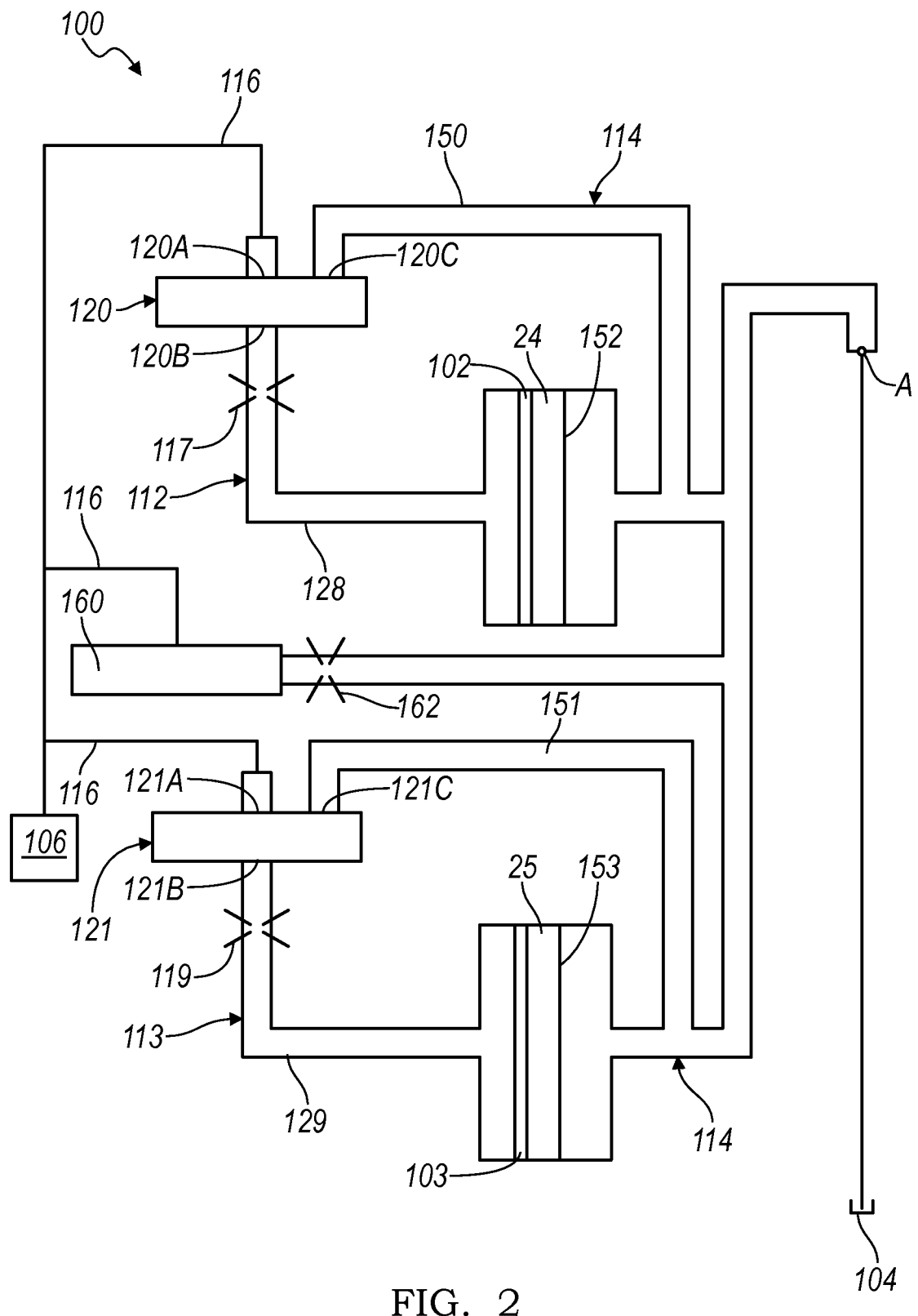
FIG. 2 is a schematic diagram of an example of a hydraulic clutch compensator feed circuit system according to the principles of the present disclosure.

Turning to FIG. 2, a portion of the hydraulic control system 100 is illustrated in more detail. The hydraulic control system 100 includes shift actuator circuits 112, 113 and a clutch compensator feed circuit 114. It should be appreciated that the hydraulic control system 100 may include various other subsystems that perform various functions within the transmission 14, such as a torque converter clutch (TCC) subsystem, a cooling subsystem, and a lubrication subsystem etc., without departing from the scope of the present invention. Also, a line pressure control subsystem may be connected to the pump 106 and may include pressure regulator valves, solenoids, and other components operable to control the pressure of the hydraulic fluid from the pump 106. Hydraulic fluid from the pump 106 is communicated at a line pressure from the line pressure control subsystem to the shift actuator circuits 112, 113 via a main supply line 116. While two shift actuator circuits 112, 113 are illustrated, it should be understood that any desired number of shift actuator circuits 112, 113 and corresponding torque transmitting mechanisms 24, 25 may be used, as explained above.

The shift actuator circuits 112, 113 each include at least one clutch regulation valve assembly 120, 121 in communication with the main supply line 116 from the pump 106. The clutch regulation valve 120 is operable to control the actuation of the torque transmitting device 24 by selectively communicating pressurized hydraulic fluid from the line pressure control subsystem (not shown) to the shift actuating device 102. Similarly, the clutch regulation valve 121 is operable to control the actuation of the torque transmitting device 25 by selectively communicating pressurized hydraulic fluid from the line pressure control subsystem (not shown) to the shift actuating device 103. It should be appreciated that the shift actuator subsystem including shift actuator circuits 112, 113 may have clutch regulation valves and control devices for controlling additional torque transmitting devices within the transmission 14 without departing from the scope of the present invention.

Each clutch regulation valve 120, 121 may include a spool valve slideably disposed in a bore, by way of example. Each clutch regulation valve 120, 121 includes an inlet port 120A, 121A, an outlet port 120B, 121B, and at least one exhaust port 120C, 121C. It should be appreciated that the clutch regulation valves 120, 121 may have various other ports and configurations without departing from the scope of the present disclosure, such as feedback ports and control ports, by way of example. The inlet ports 120A, 121A are in fluid communication with the main supply line 116. A fluid restriction orifice (not shown) may be disposed between the inlet port 120A, 121A and the main supply line 116. Each outlet port 120B, 121B is in fluid communication with a clutch feed line 128, 129. The clutch feed line 128 is in fluid communication with the shift actuating device 102, and the clutch feed line 129 is in fluid communication with the shift actuating device 103. A fluid restriction orifice 117, 119 may be placed between the clutch regulation valve 120, 121 and the shift actuating device 102, 103. The exhaust ports 120C, 121C are in communication with the compensator feed circuit 114 and also with the sump 104.

The clutch regulation valves 120, 121 have valves (not shown) that are movable between various positions including a de-stroked or first position and a stroked or second position. When the valves are in the de-stroked position, the inlet ports 120A, 121A are isolated from the outlet ports 120B, 121B. The valve may be moved to the stroked position (against a biasing member, not shown, for example) by a control device (not shown) such that the inlet ports 120A, 121A are in fluid communication with the outlet ports 120B, 121B. When the valve is in the stroked position, hydraulic fluid flows from the inlet ports 120A, 121A to the outlet ports 120B, 121B, enters the clutch feed lines 128, 129, and exerts pressure on the shift actuating devices 102, 103 to actuate the torque transmitting mechanisms 24, 25.

The compensator feed circuit 114 has a compensator feed line 150 that is filled with hydraulic fluid from the exhaust port 120C of the clutch regulation valve 120 and a compensator feed line 151 that is filled with hydraulic fluid from the exhaust port 121C of the clutch regulation valve 121. In other words, the exhaust port 120C may be in communication with the outlet port 120B and the clutch apply circuit 112 when the clutch regulation valve 120 is destroked. Thus, releasing the torque transmitting mechanisms 24, 25 adds fluid to the clutch compensator feed lines 150, 151. For example, about 2-3 mL may be added to the compensator circuit 114 each time one of the clutch regulation valves 120, 121 is stroked. The compensator feed circuit 114 may be completely filled when the fluid volume reaches about 20-100 mL, by way of example. Fluid is communicated through the compensator feed lines 150, 151 to the back sides 152, 153 of the torque transmitting devices 24, 25 to balance the centrifugal forces exerted on the torque transmitting devices 24, 25 by the pressurized fluid in the clutch feed lines 128, 129.

The compensator feed circuit 114 is open to atmosphere at point A, which is located at a point higher along the vertical axis of the transmission 14 than the sump 104. Therefore, the fluid in the compensator feed circuit 114, including the inlet lines 150, 151, has "zero" pressure, or in other words, fluid in the compensator feed circuit 114 has atmospheric pressure. Point A is located at a point at which the volume of fluid in the compensator feed circuit 114 will not merely drip out during normal operation, so that a volume of fluid remains within the compensator feed circuit 114 despite being open to atmosphere and the sump 104. For example, point A may be located near the input shaft, such that when the torque transmitting devices 24, 25 are operated, centrifugal forces cause the fluid in the compensator feed circuit 114 to flow outward from the axis of rotation. Accordingly, fluid will remain in the compensator feed circuit 114 near the back sides 152, 153 of the torque transmitting devices 24, 25 as long as they are being operated.

In the embodiment of FIG. 2, the compensator feed circuit 114 also includes a lube oil supply valve 160 in communication with the main supply line 116. Accordingly, the compensator feed circuit 114 may be supplied hydraulic fluid from the main supply line 116 to the back sides 152, 153 of the torque transmitting devices 24, 25, if desired. Since the compensator feed circuit 114 may be filled with fluid both from the main supply line 116 via the lube oil valve 160 and the exhaust ports 120C, 121C of the clutch regulation assemblies 120, 121, the lube oil valve 160 may supply a relatively small amount of fluid, and therefore, a flow restricting orifice 162 may be provided to restrict the amount of flow provided to the compensator feed circuit 114 from the main supply line 116. For example, the flow restricting orifice 162 may be one millimeter or smaller, or about ¾ millimeter or smaller.

In one embodiment, in order to selectively actuate one or both of the torque transmitting devices 24, 25, one or more control devices (not shown) is commanded by the transmission controller 26 to the open state. Hydraulic fluid at line pressure is communicated through the main supply line 116 to the control device(s), which communicates the hydraulic fluid to the clutch regulation valves 120, 121. The clutch regulation valves 120, 121 are stroked, and hydraulic fluid is communicated at line pressure from the main supply line 116, through the clutch regulation valves 120, 121 and communicated to the clutch feed lines 128, 129. The hydraulic fluid then engages the shift actuating devices 102, 103, thereby actuating the torque transmitting devices 24, 25.

Simultaneously, hydraulic fluid flows from the exhaust ports 120C, 121C of the clutch regulation valves 120, 121 to the compensator feed lines 150, 151 of the compensator feed circuit 114. Hydraulic fluid within the compensator feed lines 150, 151 communicates with the back sides 152, 153 the torque transmitting devices 24, 25 and balances the centrifugal effects of any rotating fluid trapped in the clutch feed lines 128, 129.

Figure 3:
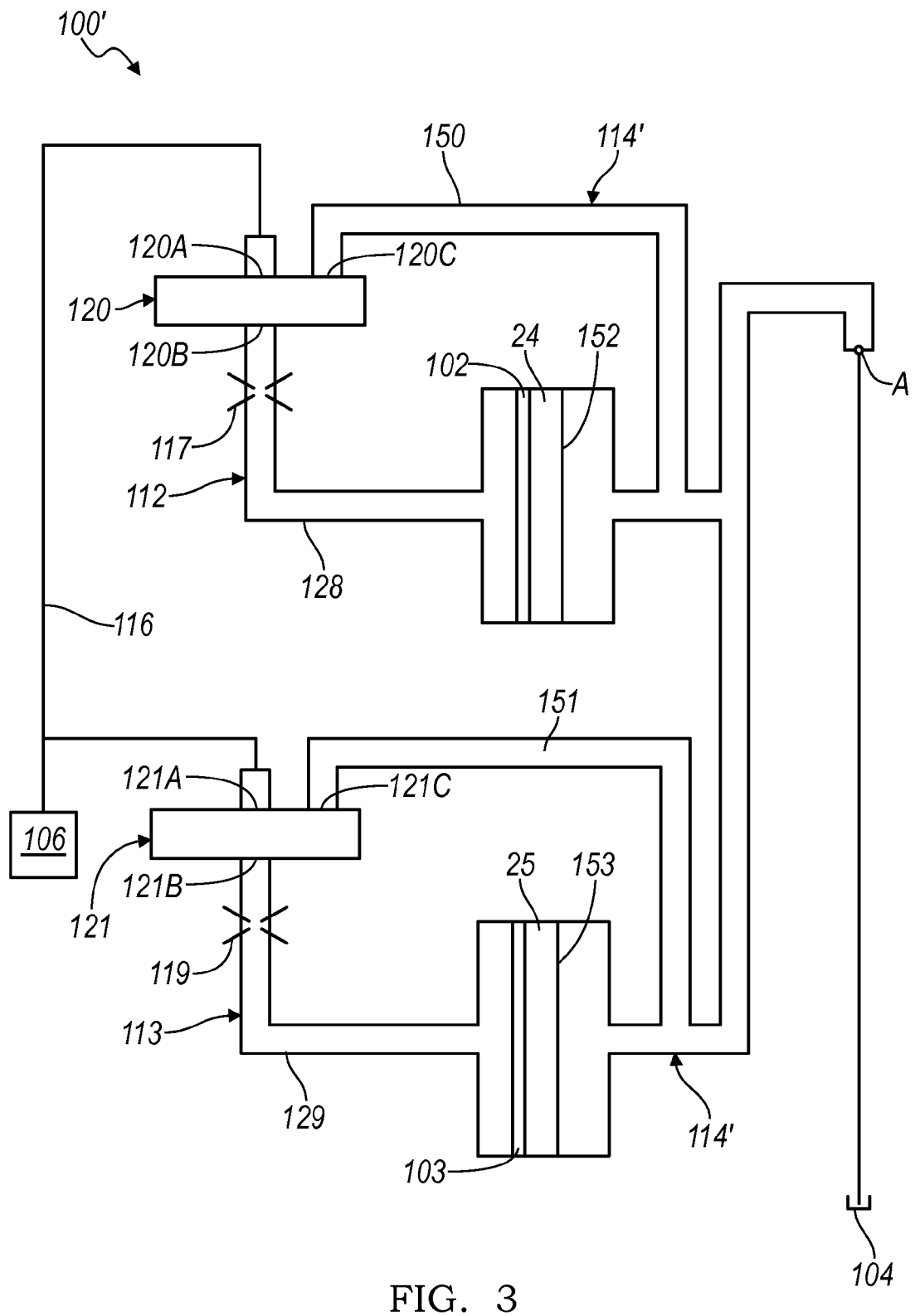
FIG. 3 is a schematic diagram of another example of a hydraulic clutch compensator feed circuit system according to the principles of the present disclosure.

Turning to FIG. 3, another example of a hydraulic control system is generally indicated by reference number 100', which may be used in the transmission 14. The hydraulic control system 100' is similar to the hydraulic control system 100 shown in FIG. 2, and like components are indicated by like reference numbers. However, in the hydraulic control system 100', the compensator feed circuit 114' is not filled by a lube oil valve 160 in communication with the main supply line 116; in other words, the lube oil valve 160 is omitted and the compensator feed circuit 114 is not in communication with the main supply line 116. Accordingly, the compensator feed circuit 114' is filled only by fluid flowing through the exhaust ports 120C, 121C of the clutch regulation valves 120, 121. The rest of the hydraulic control system 100' is identical to the hydraulic control system 100 shown in FIG. 2, and that description is herein incorporated by reference.

Referring now to FIGS. 4-5, a portion of the transmission 14 is illustrated including torque transmitting device 24 and actuating device 102. Torque transmitting device 25 and actuating device 103 are not illustrated, but they may be identical to torque transmitting device 24 and actuating device 102.

Torque transmitting device 24 is a rotating friction clutch that includes a plurality of interleaved clutch plates 38. The actuating device is a piston 42 that is surrounded by a piston housing 40. When the torque transmitting device 24 is actuated, fluid enters the clutch feed line cavity 128', which is surrounded by seals 158, and exerts pressure on the piston 42, causing it to move to the right in the orientation of FIGS. 4-5 against the coil spring 44 and compress the plurality of interleaved clutch plates 38 together to couple two shafts or components of the transmission 14 together. (In FIG. 4, the piston 42 is disengaged from the clutch plates 38.) When fluid is exhausted from the clutch regulation valve 120 (shown in FIGS. 2-3), fluid enters compensator feed line cavity 155 from the exhaust port of a clutch regulation valve (see FIGS. 2-3) and balances the centrifugal forces created by the clutch feed supply line 128. The fluid exits the compensator feed line cavity 155 and feed line 150 at point A and returns to the sump 104. In the embodiment of FIGS. 4-5, the point A is located near the middle of the torque transmitting device 24, as FIG. 4 depicts the upper half of a cross-section of the torque transmitting device 24. When the torque transmitting device 24 stops rotating, the fluid in the compensator feed line cavity 155 drains toward the central axis of the transmission 14, through a vent near point A, which is located between the piston 42 and the input shaft 18.

Referring now to FIG. 6, an example of the more specific routing of the compensator feed circuit 114 is illustrated. The compensator circuit 114 is located within the valve body 170. Fluid from the exhaust port 120C enters an exhaust line 148 at point C and flows through the exhaust line 148 to a blow-off valve 172. The blow-off valve 172 limits exhaust backfill pressure during extreme cold operation. A ball capsule air break is included to prevent draindown. Fluid flows from the exhaust line 148 to the compensator feed circuit 114 and flows through the compensator feed circuit 114 to a point B, where the fluid further travels through the transmission case to the compensator feed cavity 155 in the torque transmitting mechanism 24.

It should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for use in a transmission, the transmission having a torque transmitting device, the hydraulic control system comprising:
    a source of pressurized hydraulic fluid;
    a clutch apply circuit configured to selectively provide pressurized hydraulic fluid to a first side of the torque transmitting device to actuate the torque transmitting device;
    a compensator feed circuit configured to provide exhaust hydraulic fluid to a second side of the torque transmitting device to balance centrifugal forces originating in the clutch apply circuit;
    a lube oil supply valve in direct uninterruptible communication with the source of pressurized hydraulic fluid, and wherein the lube oil supply valve is configured to selectively provide hydraulic fluid from the source of pressurized hydraulic fluid to the compensator feed circuit; and
    wherein the clutch apply circuit is configured to selectively provide the exhaust hydraulic fluid to the compensator feed circuit.

2. The hydraulic control system of claim 1, further comprising a clutch regulation valve configured to provide the pressurized hydraulic fluid to the clutch apply circuit through an outlet port of the clutch regulation valve.

3. The hydraulic control system of claim 2, wherein the clutch regulation valve is configured to provide the exhaust hydraulic fluid to the compensator feed circuit through an exhaust port of the clutch regulation valve.

4. The hydraulic control system of claim 3, wherein the compensator feed circuit is open to atmosphere, the exhaust hydraulic fluid having atmospheric pressure.

5. The hydraulic control system of claim 4, wherein the source of pressurized hydraulic fluid is in communication with an inlet port of the clutch regulation valve.

6. The hydraulic control system of claim 5, wherein the clutch regulation valve has a spool slidably disposed in a bore formed in a housing, the spool being movable between a first position and a second position, wherein in the first position, the inlet port is in communication with the outlet port, and in the second position, the inlet port is isolated from the outlet port.

7. The hydraulic control system of claim 6, wherein in the second position, the outlet port is in communication with the exhaust port to allow the pressurized hydraulic fluid to drain from the clutch apply circuit to the compensator feed circuit.

8. The hydraulic control system of claim 6, further comprising an exhaust line in communication with the exhaust port and with the compensator feed circuit, the exhaust line connecting the exhaust port to the compensator feed circuit, the hydraulic control system further comprising a blow-off valve disposed between the exhaust line and the compensator feed circuit.

9. The hydraulic control system of claim 6, wherein the torque transmitting device is provided as a rotating torque transmitting device having a plurality of interleaved clutch plates.

10. The hydraulic control system of claim 9, wherein the torque transmitting device is a first torque transmitting device, the clutch apply circuit is a first clutch apply circuit, and the compensator feed circuit is a first compensator feed circuit, the hydraulic control system further comprising a second torque transmitting device, a second clutch apply circuit configured to selectively provide pressurized hydraulic fluid to a first side of the second torque transmitting device to actuate the second torque transmitting device, and a second compensator feed circuit configured to provide exhaust hydraulic fluid to a second side of the second torque transmitting device to balance centrifugal forces originating in the second clutch apply circuit, wherein the second clutch apply circuit is configured to selectively provide the exhaust hydraulic fluid to the second compensator feed circuit.

11. A hydraulic control system for use in a transmission, the hydraulic control system comprising:
- a torque transmitting device;
- an hydraulic fluid pump for providing a pressurized hydraulic fluid to an output of the hydraulic fluid pump;
- a clutch apply circuit configured to selectively provide the pressurized hydraulic fluid to a first side of the torque transmitting device to actuate the torque transmitting device;
- a clutch regulation valve having a high pressure input port, a high pressure output port and an exhaust port, and wherein the high pressure input port is in communication with the output of the hydraulic fluid pump, the high pressure output port is in communication with the clutch apply circuit, and the clutch regulation valve operable to selectively allow communication of the pressurized hydraulic fluid from the hydraulic fluid pump to the clutch apply circuit;
- a compensator feed circuit configured to provide exhaust hydraulic fluid to a second side of the torque transmitting device to balance centrifugal forces originating in the clutch apply circuit, and wherein the compensator feed circuit is in direct communication with the exhaust port of the clutch regulation valve; and
- a lube oil supply valve in direct uninterruptible communication with the output of the hydraulic fluid pump, and wherein the lube oil supply valve is configured to selectively provide the pressurized hydraulic fluid to the compensator feed circuit.

12. The hydraulic control system of claim 11, wherein the clutch regulation valve is configured to provide the pressurized hydraulic fluid to the first side of the torque transmitting device through the high pressure output port of the clutch regulation valve, the clutch regulation valve being configured to provide the exhaust hydraulic fluid to the second side of the torque transmitting device through the exhaust port of the clutch regulation valve.

13. The hydraulic control system of claim 12, wherein the compensator feed circuit is open to atmosphere, the exhaust hydraulic fluid having atmospheric pressure.

14. The hydraulic control system of claim 13, wherein the pressurized hydraulic fluid is in communication with the high pressure input port of the clutch regulation valve, the clutch regulation valve having a spool slidably disposed in a bore formed in a housing, the spool being movable between a first position and a second position, wherein in the first position, the high pressure input port of the clutch regulation valve is in communication with the high pressure output port of the clutch regulation valve, and in the second position, the high pressure input port of the clutch regulation valve is isolated from the high pressure output port of the clutch regulation valve.

15. The hydraulic control system of claim 14, wherein in the second position, the high pressure output port of the clutch regulation valve is in communication with the exhaust port of the clutch regulation valve to allow fluid to drain from the clutch apply circuit to the compensator feed circuit.

16. The hydraulic control system of claim 14, further comprising an exhaust line in communication with the exhaust port and with the compensator feed circuit, the exhaust line connecting the exhaust port to the compensator feed circuit, the hydraulic control system further comprising a blow-off valve disposed between the exhaust line and the compensator feed circuit.

17. The hydraulic control system of claim 16, wherein the torque transmitting device is a rotating torque transmitting device having a plurality of interleaved clutch plates.

18. A hydraulic control system for use in a dual input clutch transmission, the hydraulic control system including:
- a hydraulic fluid pump having an input port and an output port, and wherein the input port is in communication with a sump;
- a first clutch regulation valve having a first input port, a first high pressure output port, and a first exhaust output port, and wherein the first input port is in direct communication with the output port of the hydraulic fluid pump;
- a second clutch regulation valve having a second input port, a second high pressure output port, and a second exhaust output port, and wherein the second input port is in direct communication with the output port of the hydraulic fluid pump;
- a first torque transmitting device having a first piston with an apply side and a compensator side, and wherein the apply side of the first piston is in direct communication with the high pressure output port of the first clutch regulation valve and the compensator side of the first piston is in direct communication with the exhaust output port of the first clutch regulation valve;
- a second torque transmitting device having a second piston with an apply side and a compensator side, and wherein the apply side of the second piston is in direct communication with the high pressure output port of the second clutch regulation valve and the compensator side of the second piston is in direct communication with the exhaust output port of the second clutch regulation valve;
- a lubrication valve having an input port and an output port, and wherein the input port of the lubrication valve is in direct communication with the output port of the hydraulic fluid pump, and the output port of the lubrication valve is in direct communication with each of the compensator side of the first piston of the first torque transmitting device and the compensator side of the second piston of the second torque transmitting device.

* * * * *